(No Model.)  2 Sheets—Sheet 1.

J. ROE.
PROTRACTOR.

No. 431,484. Patented July 1, 1890.

Witnesses:
Will? Norton
Nowell Bartle

Inventor:
Justus Roe
by Johnson & Johnson
his Attys.

THE NORRIS PETERS CO., PHOTO-LITHO., WASHINGTON, D. C.

(No Model.) 2 Sheets—Sheet 2.

J. ROE.
PROTRACTOR.

No. 431,484. Patented July 1, 1890.

Witnesses:
Wm. F. Norton
Howell Bartle

Inventor:
J. Justus Roe
by Johnson & Johnson
his Attys.

UNITED STATES PATENT OFFICE.

JUSTUS ROE, OF PATCHOGUE, NEW YORK.

PROTRACTOR.

SPECIFICATION forming part of Letters Patent No. 431,484, dated July 1, 1890.

Application filed March 22, 1890. Serial No. 344,917. (No model.)

*To all whom it may concern:*

Be it known that I, JUSTUS ROE, a citizen of the United States, residing at Patchogue, in the county of Suffolk and State of New York, have invented new and useful Improvements in Protractors, Plotters, &c., of which the following is a specification.

My invention relates to protractors and plotters; and my improvement consists in the construction and combination or arrangement of parts hereinafter fully disclosed in the description, drawings, and claims.

The objects of my invention are to provide an improved instrument for reading and protracting angles and for measuring and drawing lines; to provide an instrument adapted to form right-angled triangles of varying sizes, and to provide an instrument capable of being folded into a sufficiently small compass to be carried in a pocket and of being rigid and true when opened for use. These objects I attain in the device illustrated in the accompanying drawings, forming part of this specification, in which the same reference-letters indicate the same parts, and in which—

Figure 1:
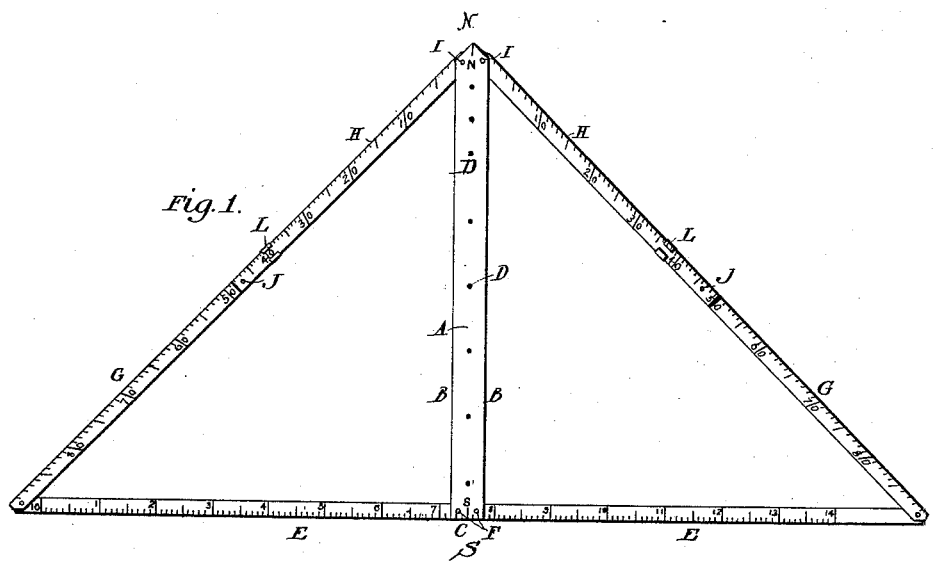
Figure 2:
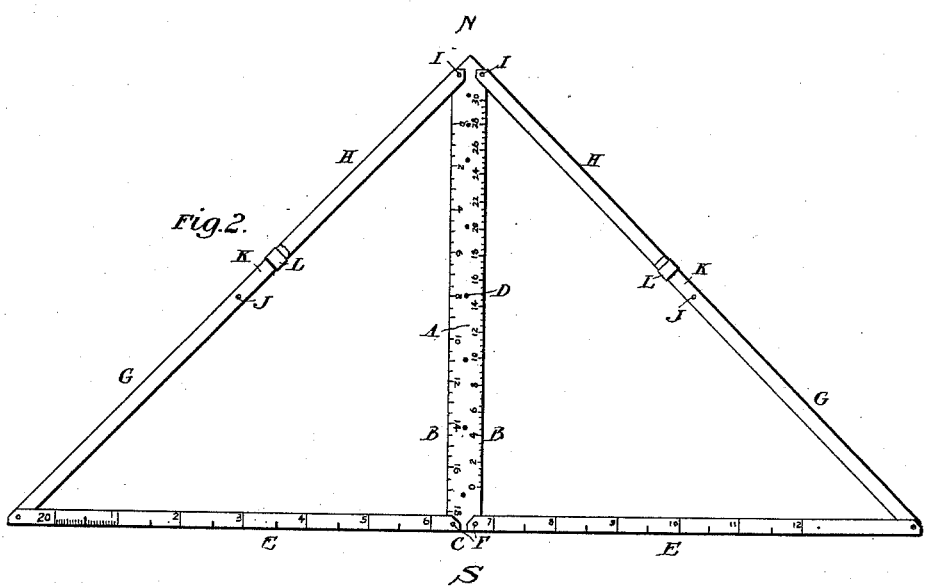
Figure 3:
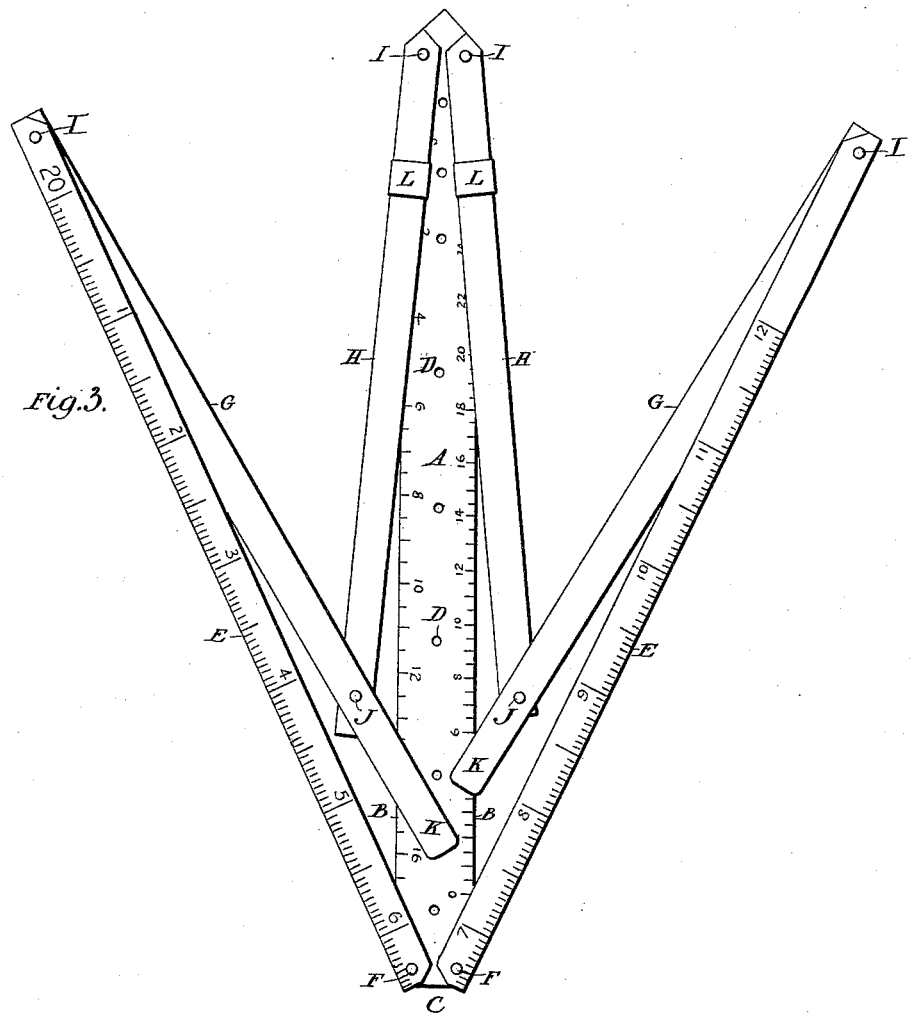
Figure 4:
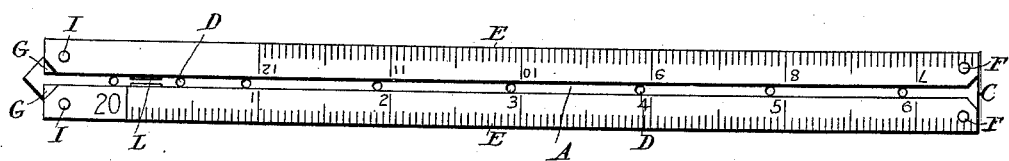

Figure 1 represents a plan view of the instrument, showing it unfolded and ready for use; Fig. 2, a similar view of the other side of the instrument; Fig. 3, a view of the instrument in the position of being folded, and Fig. 4 a view of the folded instrument.

In the drawings, the letter A indicates a flat strip or ruler having parallel edges B, which are suitably divided and marked to form scales. One end of said ruler is cut off at right angles to the edges and the other end C is cut off to form a right-angled point. The central line of this ruler is indicated by marks at the ends of the same, the pointed end being marked N and the square end being marked S. A row of holes D are formed in the central line of the ruler, and said holes are placed at regular distances from each other—as, for example, at the distance of one inch or one-half inch apart.

Two flat arms E, which form the base of the large triangle when the instrument is folded out, are pivoted upon rivets F at the square end of the ruler A. Two pairs of arms G and H are pivoted to the ends of said arms E and to the pointed end of the ruler A upon pivots or rivets I. The ends of the arms in each pair overlap and are pivoted together upon rivets J, and the overlapping ends K of said arms G may be secured rigidly and in line with the arms H by means of slides L, which slide upon said arms H and over said ends K.

The arms E, which form the base of the triangle, have their edges divided and marked with measuring graduations—for example, inches and their fractions—and the arms G H are graduated to indicate the number of degrees of angles in a semicircle described around the point S as center.

The proportions of the instrument are preferably the following: The base of the triangle formed by the extended instrument is about fourteen inches long, and the sides of the triangle are each about ten inches long. This will produce, by having the strip or ruler A acting as the perpendicular in the triangle, two smaller triangles of about seven and ten inches sides, besides the large triangle of about ten and fourteen inches sides. The instrument will have three right angles and four angles of forty-five degrees, and it will read and protract angles from one to one hundred and eighty degrees.

In practice the instrument is unfolded and the arms G H straightened out and secured by their slides. Angles may now be read and protracted upon the arms G H, the center being at S. Straight lines may be drawn and measured by and upon the base and perpendicular of the triangle and all manner of straight-edge drawing and plotting may be made. By placing a pin or other sharp-pointed instrument in one of the holes in the ruler A and securing said pin at the desired point circles may be drawn around said point with various radii by inserting the point of a pencil through the hole at the desired distance from the hole having the pin and revolving the instrument and pencil around the pin. When angles are to be transferred from one map or drawing to another, or from an article to a drawing, the slide which secures one pair of arms G H may be slid off from the overlapping end K, and said arms may then be set to the desired angle over the original angle, which may thus be transferred and drawn without further measurement.

For protracting angles of ninety degrees or less, one arm E and one pair of arms G H may be dispensed with.

When not in use, the instrument may be folded up into a very small compass and be carried in the pocket or in a note-book. The parts A E E are of equal length. The parts G H are of less length, and are themselves of unequal length.

There is a very particular and special advantage in making the instrument double, as thereby I am enabled to produce a semi-circle protractor instead of a quarter-circle and give a much larger right angle or square with the same-sized instrument.

I claim as my improvement—

1. In a plotter and protractor, the combination of a ruler and an arm pivoted at one end of the same, with two arms pivoted to the ends of said ruler and arm and to each other, to be straightened out to form the hypotenuse of a right-angled triangle having said ruler and arm for catheti, said arms having divisions marked upon them to indicate the degrees of angles, substantially as described.

2. In a plotter and protractor, the combination of a ruler having a squared end and a right-angled pointed end, two arms pivoted at the squared end of said ruler, and two pairs of arms pivoted at the ends of said arms and at the point of said ruler pivoted together, and having divisions marked upon them to indicate the degree of angles, substantially as described.

3. In a plotter and protractor, the combination of a ruler having a squared and a right-angled pointed end having graduated edges, and having a series of holes at regular intervals, two graduated arms pivoted to the square end of said ruler, two pairs of arms pivoted to the ends of said arms and to the pointed end of said ruler, having their meeting ends pivoted to each other and one end overlapping the other, and having graduations marked upon them to indicate the degree of angles, and slides upon one set of said pairs of arms for engaging the overlapping ends of the other set, substantially as described.

4. The herein-described instrument for protracting and plotting, consisting of a ruler part A, having pivoted at one end two arms E E equal in length and to the length of the ruler, two arms H H, of equal length, but of less length than that of the ruler, and pivoted to the other end of the latter, and two arms G G, pivoted to the ends of the arms H, having a length greater than the latter, and having the slides L L, the said arms being of less width than the ruler, graduated and adapted to form right-angled triangles on each side thereof and to be folded thereon, substantially as described.

In testimony whereof I have hereunto set my hand in the presence of three subscribing witnesses.

JUSTUS ROE.

Witnesses:
 AUSTIN ROE, Jr.,
 G. HOWARD ROE,
 MILTON G. WIGGINS.